United States Patent
Mazoyer et al.

(10) Patent No.: US 9,219,286 B2
(45) Date of Patent: Dec. 22, 2015

(54) HOUSING, IN PARTICULAR FOR A BIOFUEL CELL

(75) Inventors: Pascale Mazoyer, Domene (FR); Aomar Halimaoui, La Terrasse (FR)

(73) Assignees: STMicroelectronics SA, Montrouge (FR); STMicroelectronics (Crolles 2) SAS, Crolles (FR)

(*) Notice: Subject to any disclaimer, the term of this patent is extended or adjusted under 35 U.S.C. 154(b) by 255 days.

(21) Appl. No.: 13/993,634

(22) PCT Filed: Dec. 12, 2011

(86) PCT No.: PCT/EP2011/072434
§ 371 (c)(1),
(2), (4) Date: Jun. 12, 2013

(87) PCT Pub. No.: WO2012/080162
PCT Pub. Date: Jun. 21, 2012

(65) Prior Publication Data
US 2013/0273440 A1    Oct. 17, 2013

(30) Foreign Application Priority Data
Dec. 16, 2010   (FR) ..................... 10 60638

(51) Int. Cl.
*H01M 8/16* (2006.01)
*H01G 11/52* (2013.01)
*H01G 11/78* (2013.01)
(Continued)

(52) U.S. Cl.
CPC ............. *H01M 8/16* (2013.01); *H01G 11/52* (2013.01); *H01G 11/78* (2013.01); *H01M 8/1097* (2013.01); *H05K 5/02* (2013.01);
(Continued)

(58) Field of Classification Search
CPC ..... H01G 11/52; H01G 11/78; H01M 8/1097; H01M 8/16; H05K 5/02; Y02E 60/527; Y02E 60/521; Y02E 60/13
See application file for complete search history.

(56) References Cited

U.S. PATENT DOCUMENTS

| 2006/0255464 A1* | 11/2006 | D'Arrigo et al. ... H01M 8/1004 257/758 |
| 2007/0275300 A1* | 11/2007 | Salot et al. ............. H01G 9/016 429/163 |
| 2011/0053053 A1* | 3/2011 | Desplobain et al. H01M 8/0232 429/532 |

FOREIGN PATENT DOCUMENTS

| EP | 1798799 A1 | 6/2007 |
| EP | 1860722 A2 | 11/2007 |

(Continued)

OTHER PUBLICATIONS

INPI Search Report and Written Opinion for FR1060638 mailed Aug. 30, 2011 (8 pages).

(Continued)

*Primary Examiner* — Muhammad Siddiquee
(74) *Attorney, Agent, or Firm* — Gardere Wynne Sewell LLP (57) ABSTRACT

A housing includes a body with a first silicon element and a second porous silicon element, at least one first cavity provided in the porous silicon element, a first electrically conducting contact area electrically coupled to at least a portion of at least one internal wall of the at least one first cavity, and a second electrically conducting contact area electrically coupled to a different portion of the at least one internal wall of the second porous silicon element of the at least one first cavity, wherein the two contact areas are electrically isolated from each other.

27 Claims, 9 Drawing Sheets

(51) Int. Cl.
  *H01M 8/10* (2006.01)
  *H05K 5/02* (2006.01)

(52) U.S. Cl.
  CPC ............... *Y02E 60/13* (2013.01); *Y02E 60/521* (2013.01); *Y02E 60/527* (2013.01)

(56) References Cited

FOREIGN PATENT DOCUMENTS

| FR | 2857163 A1 | 1/2005 |
| WO | WO-2009047453 A1 | 4/2009 |

OTHER PUBLICATIONS

International Search Report and Written Opinion for PCT/EP2011/072434 mailed Jan. 25, 2012 (11 pages).

Cinquin P et al: "A Glucose Biofuel Cell Implanted in Rats," PLOS ONE, Public Library of Science, San Francisco, CA, US, vol. 5, No. 5, May 1, 2010, pp. 1-7.

Lewis Dartnell: "Sparks of Life," The Alchemist, the Chemweb Magazine, Nov. 1, 2003, URL: http://www.ucl.ac.uk/-ucbplrd/sparks_pagehtm) (6 pages).

* cited by examiner

HOUSING, IN PARTICULAR FOR A BIOFUEL CELL

PRIORITY CLAIM

This application is a 371 filing from PCT/EP2011/072434 filed Dec. 12, 2011 which claims priority from French Application for Patent No. 1060638 filed Dec. 16, 2010, the disclosures of which are hereby incorporated by reference.

TECHNICAL FIELD

The invention relates to microelectronics and more particularly to packages capable, for example but not exclusively, of being used to produce biofuel cells.

BACKGROUND

A biofuel cell is a fuel cell that uses enzymes or microorganisms, such as bacteria, to convert some of the energy available in a biodegradable substrate into electricity.

In general, a biofuel cell comprises an electrode, forming the anode, placed in contact with enzymes for the transformation of the biodegradable substrate, for example glucose, in particular by electrons captured by the anode. The biofuel cell also comprises a cathode at which an electron acceptor, for example air, is reduced, for example to water.

A potential difference therefore appears between the anode and the cathode when these are connected to a load.

There are many publications in the biofuel cell field.

Mention may particularly be made of the article by Philippe Cinquin, et al. entitled "A Glucose BioFuel Cell Implanted in Rats", PLoS ONE/www.plosone.org, May 2010/volume 5/Issue 5/e10476 (the disclosure of which is incorporated by reference), which describes the production of an experimental biofuel cell implanted into a rat. This biofuel cell is capable of producing in vivo electricity by virtue of the aforementioned redox phenomenon from oxygen and glucose that are present in the physiological fluids of the rat. Two different powders are used at the anode and cathode respectively.

Mention may also be made of the article by Lewis Dartnell, entitled "Sparks of Life" available at the Internet address http://www.ucl.ac.uk/~ucbplrd/sparks_page.htm (the disclosure of which is incorporated by reference). This article describes a biofuel cell using bacteria called Rhodoferax ferrireducens at the anode.

Industrially acceptable solutions should now be proposed in particular for reducing the size of the implants and to increase the power generated by these biofuel cells.

SUMMARY

According to one embodiment, a package is provided that can be used in particular but not exclusively as an element of a biofuel cell, which is industrially achievable and is compatible with implantation into humans.

According to one aspect, a package has a body comprising a first element made of silicon and a second element made of porous silicon, at least one first cavity provided at least in the porous silicon, a first electrically conducting contact zone electrically coupled to at least one part of at least one internal wall of said at least one first cavity, and a second electrically conducting contact zone electrically coupled to a portion of the package, said portion extending at least into said second element and being different from the internal walls of said at least one first cavity, the two contact zones being electrically isolated from each other.

According to or one variant, the body further includes at least one second cavity provided at least in the porous silicon and said portion of the package, which portion is different from the internal walls of said at least one first cavity comprises at least one part of at least one internal wall of said at least one second cavity.

According to another variant, said portion of the package comprises pores of the porous silicon.

In other words, according to this other variant, unlike the previous variant, no second cavity is provided in the porous silicon.

Whatever the variant, according to one embodiment, the first contact zone is located on a first face of the first element of the body, and the body comprises first electrically conducting connection means extending through the first element from said first contact zone down to said at least one part of said at least one internal wall of said at least one first cavity.

Although the electrically conducting means may be formed from silicon, it is preferable that the first connection means comprise a first region formed from a metal suicide surrounded by an insulating region. This makes it possible to prevent oxidation, in particular when the electrically conducting connection means are in contact with a liquid active product.

According to one embodiment, said at least one first cavity opens onto the free face of the second element, on the opposite side from said first face of the first element.

According to one embodiment, the second contact zone is located on said first face of the first element of the body, and the body comprises second electrically conducting connection means extending through said first element from said second contact zone down to said portion of the package.

Here again, it is preferable for these second connection means to comprise a second region formed from a metal silicide.

This second region is also preferably surrounded by an insulating region.

In the variant in which at least one second cavity is provided at least in the porous silicon, this second cavity may open onto the free face of the second element, on the opposite side from said first face of the first element. In other words, according to this embodiment, said at least one first cavity and said at least one second cavity open onto the same free face of the body.

It is also possible for said at least one second cavity to open onto said first face of said first element. In other words, according to this embodiment, said at least one first cavity and said at least one second cavity open onto two opposite faces of the body.

The pore size of the porous silicon is advantageously of the order of a few nanometers and the package has, according to one embodiment, a size compatible with implantation into humans.

According to another aspect, a device comprises a package as defined above, a first active product, for example a compacted enzyme powder, contained in said at least one first cavity, a second active product, for example another compacted enzyme product, contained in said at least one second cavity, first closure means for closing off said at least one first cavity and second closure means for closing off said at least one second cavity.

When the package does not include a second cavity, an embodiment is a device comprising a package as defined above, a first active product contained in said at least one first cavity and first closure means for closing off said at least one first cavity.

At least one of the first and second active products comprises, for example, a powder, the particle size of which is greater than the pore size of the porous silicon.

The porous silicon therefore advantageously acts as a membrane.

According to another aspect, it is proposed to use the device as defined above as a biofuel cell when an active fluid, for example a biological liquid, flows through the porous silicon in order to interact with the active product or products contained in said cavity or cavities, a potential difference being generated between the two electrically conducting contact zones.

BRIEF DESCRIPTION OF THE DRAWINGS

Other advantages and features will become apparent on examining the detailed description of entirely nonlimiting embodiments, and the appended drawings in which.

DETAILED DESCRIPTION OF THE DRAWINGS

Figure 1:
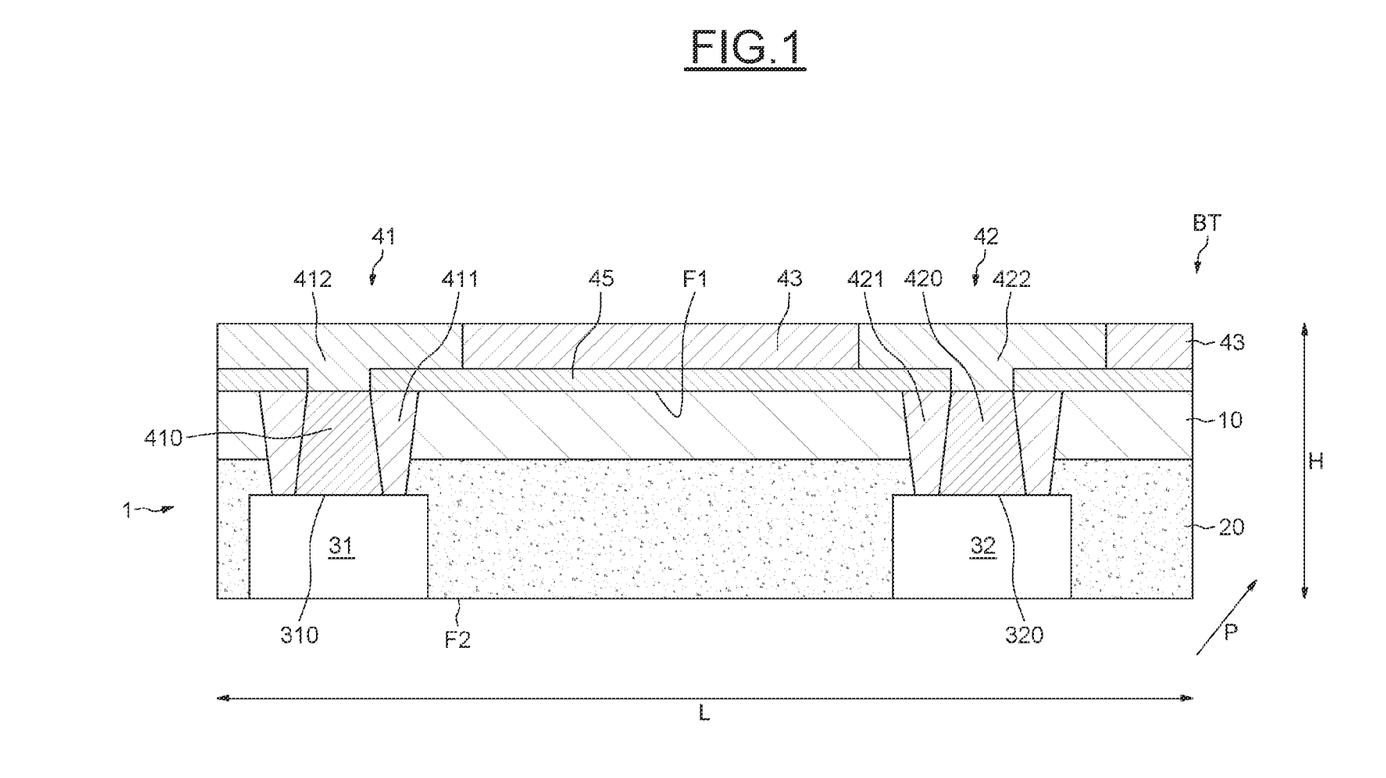
FIG. 1 illustrates schematically a first embodiment of a package.

In FIG. 1, the reference BT denotes a package comprising a body 1. This body 1 comprises a first element 10 made of silicon and a second element 20 made of porous silicon. The two elements 10 and 20 are bonded together. A first cavity 31 is provided in the porous silicon second element 20 and opens onto the free face F2 of the second element.

A second cavity 32 is provided in. the porous silicon second element 20 and also opens onto the free face F2 of the second element.

A first electrically conducting contact zone 41 and a second electrically conducting contact zone 42 are provided on the first face F1 of the first element 10, namely the face F1 which here is opposite the free face F2 of the second element.

The first electrically conducting contact zone 41 is electrically coupled to a part 310 of the internal bottom wall of the first cavity 31.

Likewise, the second electrically conducting contact zone 42 is electrically coupled here to a part 320 of the internal bottom wall of the second cavity 32.

This being the case, it is possible, as a variant, for the electrically conducting contact zone or zones to be electrically coupled to several internal walls of corresponding cavities.

The first electrically conducting contact zone 41 comprises here a first metal contact pad 412, whereas the second electrically conducting contact zone 42 comprises a second metal contact pad 422.

The body 1 also comprises first electrically conducting connection means 410 extending through the first element 10 from the first contact zone 412 down to the part 310 of the internal bottom wall of the first cavity 31.

These first connection means comprise here a first region 410 formed from a metal silicide, for example titanium silicide, surrounded by an insulating region 411.

Likewise, the second electrically conducting connection means comprise here a second region 420 also formed from a metal suicide, for example also titanium silicide, surrounded by an insulating region 421.

The first contact pad 412 comes into contact with the first silicided region 410 through an opening made in an insulating layer 45, for example a silicon nitride layer.

Likewise, the second contact pad 422 comes into contact with the second silicided region 420 through another opening in this layer 45.

Finally, the top parts of the two contact pads 412 and 422 are isolated from each other by an insulating layer 43, for example made of silicon dioxide.

The two contact zones 41 and 42 consequently are electrically isolated from each other.

The dimensions of the package BT are, in this embodiment, advantageously chosen so that the package BT can be easily implanted into humans. As a nonlimiting example, the length L of the package BT is of the order of a few millimeters, for example between 1 and 20 mm, whereas the height H of the package is of the order of a few microns, for example between 100 and 750 microns, and the depth (width) P of the package BT is of the order of a few millimeters, for example between 1 and 20 mm.

Moreover, the pore size of the porous silicon is, in this embodiment, of the order of a few nanometers, typically from 2 to 3 nanometers.

Of course, although the package has been shown here with a parallelepipedal shape, it could be of any shape, for example cylindrical.

Figure 2:
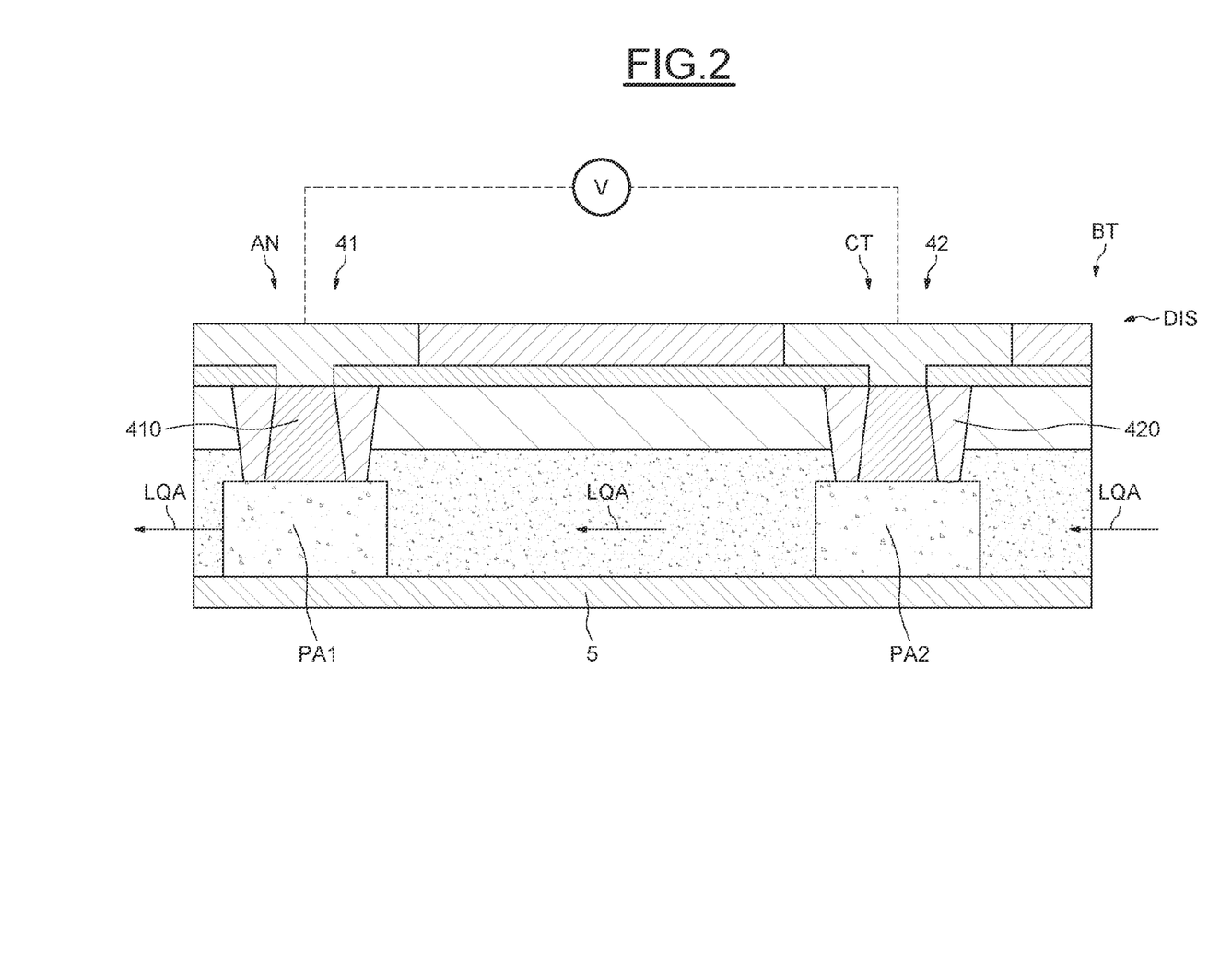
FIG. 2 illustrates schematically a first embodiment of a device.

In FIG. 2, the reference DIS denotes a device that can be used as a cell. More precisely, in the example described here, the first cavity 31 is filled with a first active product PA1, for example a product in the form of a compacted powder, whereas the second cavity is filled with a second active product PA2, for example also a compacted powder.

A closure means 5, such as for example a silicon wafer or a glass plate, is bonded to the face F2 of the package by any known means.

An active fluid LQA, or electrolyte, can then flow through the porous silicon, penetrating the device via all the free faces of the porous silicon second element 20 so as to react with the active products PA1 and PA2. The active fluid LQA can also escape through other free faces of the porous silicon.

Of course, the particle size of the powders PA1 and PA2 and the pore size of the porous silicon are adjusted so that the active products PA1 and PA2 do not escape from the cavities 31 and 32, while still being able to react with the active fluid LQA.

In other words, the pore size of the porous silicon may be larger than 2 or 3 nanometers if the particle size of the powders so allows.

Moreover, the first silicided region 410 is in contact with the active product PA1, whereas the second silicided region 420 is in contact with the active product PA2. The first electrically conducting contact zone 41 then forms for example the anode AN of the cell, whereas the second contact zone 42 forms for example the cathode CT of the cell. By dint of the interaction between the active products PA1 and PA2, contacting the shielded regions 410 and 420, with the active liquid LQA, a current can flow between the anode and the cathode and consequently a voltage difference P is available across the terminals 41 and 42 of the device.

When the package has a size such that it can be implanted into humans, the device DIS can then be used as a biofuel cell. It is therefore possible, by way of example, to use as active products PA1 and PA2 and as liquid LQA those described in the aforementioned article by Philippe Cinquin.

In general, a package BT may be easily produced using conventional techniques, known per se, used in microelectronics to fabricate integrated circuits.

Generally, several packages BT are produced at the same time starting from the same silicon wafer. Next, after the constituents of the package have been completed, the wafer is diced so as to singulate the packages obtained.

The packages may for example be produced in 0.35 micron technology on semiconductor wafers 200 mm in diameter, or else on 300 mm diameter wafers in advanced CMOS technology.

Reference will now be made more particularly to FIGS. 3 to 7 in order to illustrate an embodiment of a package such as that illustrated in FIG. 1. For reasons of simplification, the production of just one package will be described here.

Figure 3:
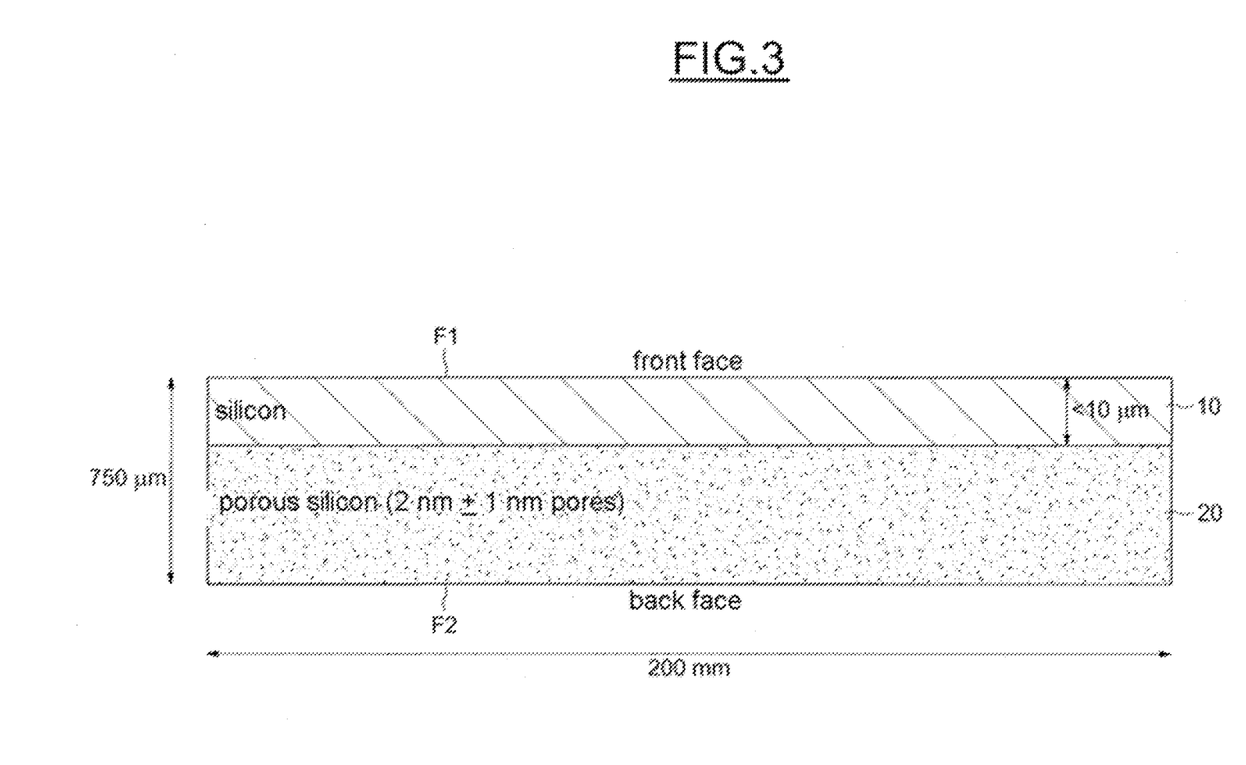
FIGS. 3 to 7 illustrate schematically an example of the fabrication of a package.

In a first step, illustrated in FIG. 3, porous silicon is formed in the silicon substrate. As is well known to those skilled in the art, porous silicon is obtained by electrochemical anodization of solid silicon in a hydrofluoric acid (HF) solution.

A person skilled in the art will adjust the electrochemistry parameters so as to obtain the desired porous silicon height and the desired pore size. As an example, porous silicon having a pore size of the order of a few nanometers, for example 1 to 3 nanometers may be obtained by using p-doped silicon anodized with a current density of 20 mA/cm$^2$ in a 35% hydrofluoric acid solution.

After this electrochemical anodization, the structure illustrated in FIG. 3 is obtained, this comprising the silicon first element 10, having for example a height of less than 10 microns, and the porous silicon second element 20, having a thickness of around 740 microns for a total height of the two elements of around 750 microns.

Figure 4:
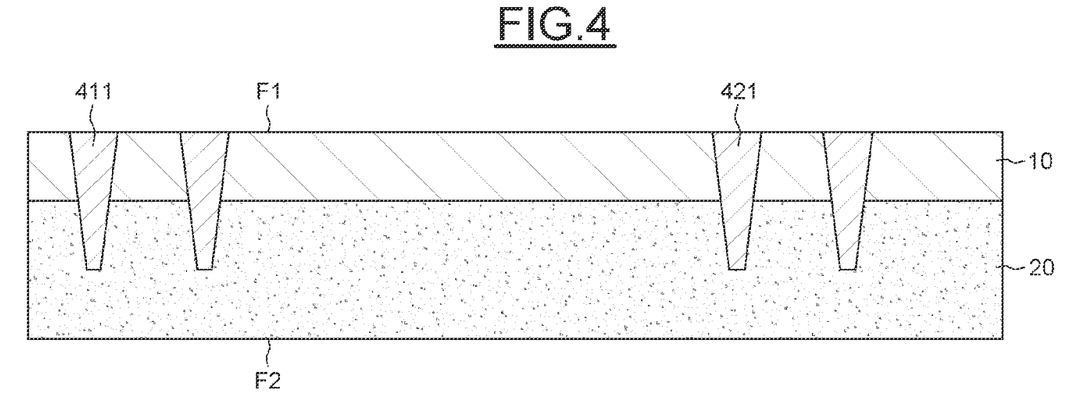
Figure 5:
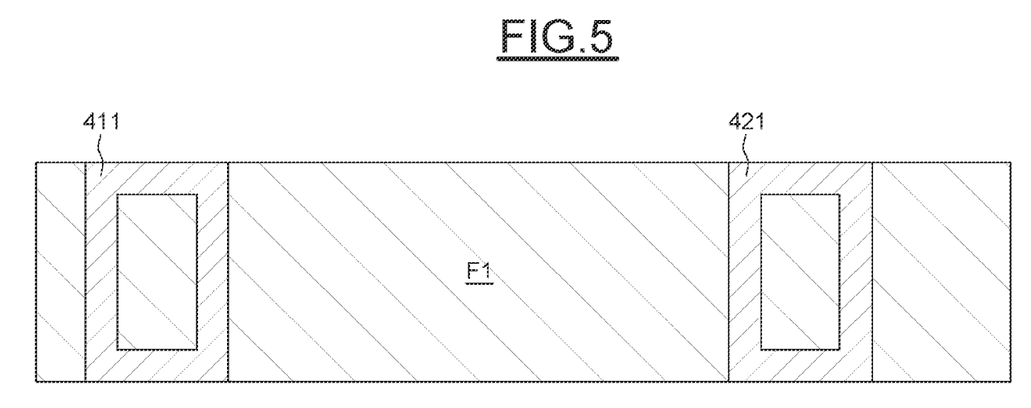

The doping level of the intrinsic silicon is for example $10^{15}$ atoms/cm$^3$. Higher doping levels (greater than $10^{17}$ atoms/cm$^3$) may also be used. Next, as illustrated in FIGS. 4 and 5, isolating trenches 411 and 421 are formed using a conventional etching mask (not shown here). To produce these trenches, it is possible to use a technique identical to that used in microelectronics to form vias through a substrate, usually designated by those skilled in the art by the acronym TSVs (through-silicon vias). For example, trenches having a depth of around 3 to 10 microns are formed, which are filled with an insulating material, for example silicon dioxide.

Figure 6:
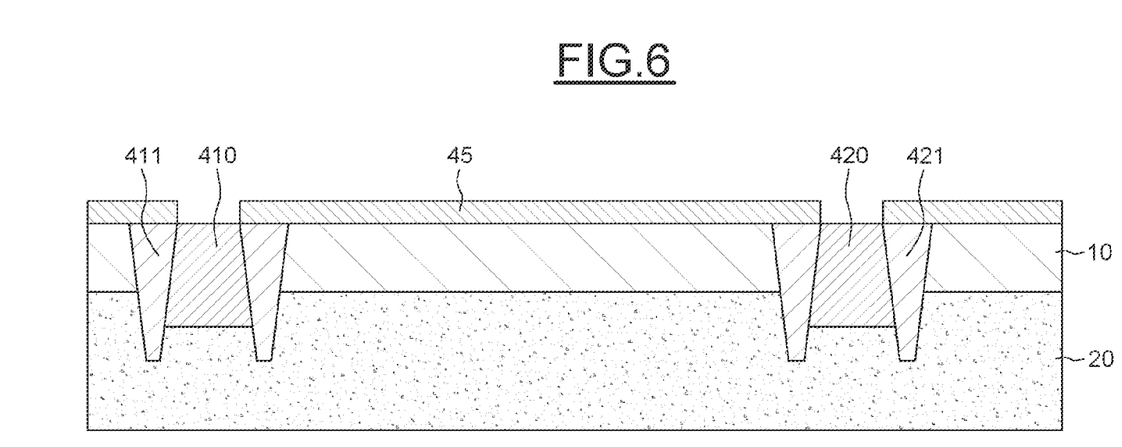

Next, as illustrated in FIG. 6, a mask for forming the silicided zones 410 and 420 is defined. This mask may be formed from an insulating layer, for example made of silicon nitride, the apertures of which correspond to the internal space bounded by the isolating trenches 411 and 421.

Figure 7:
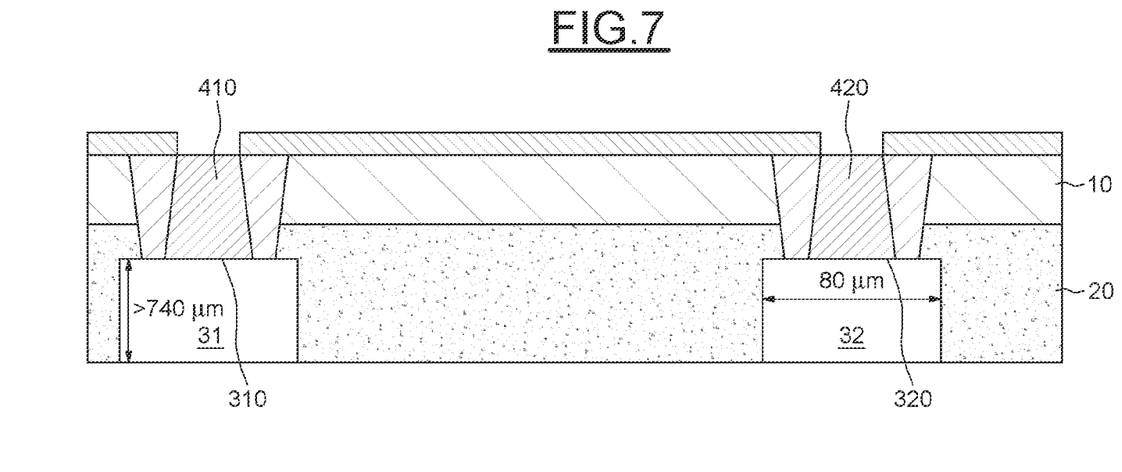

Next, the silicon and the porous silicon are conventionally silicided through the mask 45 so as to obtain the silicided regions 410 and 420. Next, as illustrated in FIG. 7, the cavities 31 and 32 are produced, for example by plasma chemical etching using a fluorocarbon compound (for example Si$_6$ or CF$_4$) so as to obtain cavities of desired depth and width. As an example, the depth of the cavities may be around 740 microns or more, whereas the width may be around 80 microns.

The bottom walls of the two cavities 31 and 32 formed here in the porous silicon consequently come into contact with the silicided zones in the parts 310 and 320 of these bottom walls.

It should be noted here that the etching operation may etch part of the insulating regions 411 and part of the silicided region 410.

It would also be possible using the etching operation for at least one of the cavities to extend right into the silicon.

Figure 8:
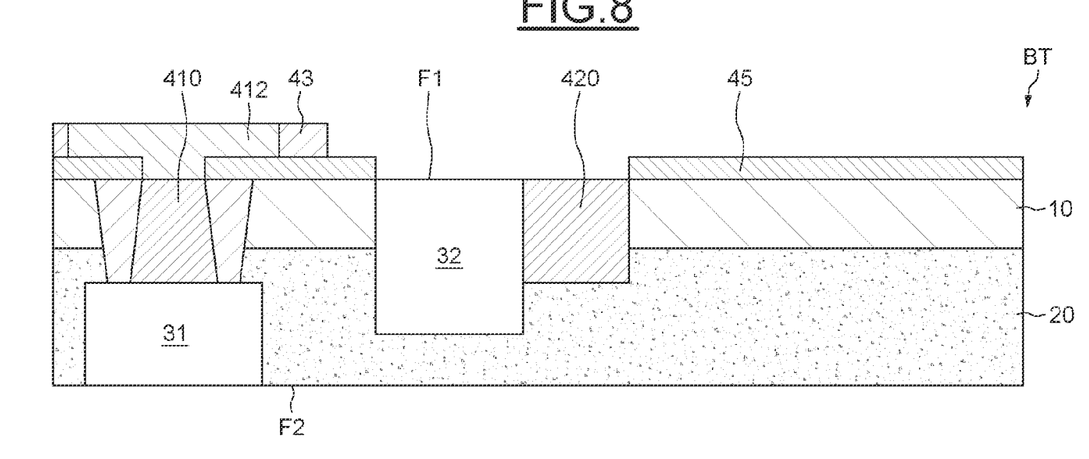
FIGS. 8 and 9 illustrate schematically a second embodiment of a package.

Next, the contact pads 412 and 422 are conventionally produced by depositing metal in the apertures of the insulating layer 43 (FIG. 1), FIG. 8 illustrates another embodiment of the package BT, in which the two cavities 31 and 32 open onto the two opposed faces F1 and F2 of the body.

More precisely, the first cavity 31 opens onto the rear face F2 whereas the second cavity 32 opens onto the front face F1.

Moreover, the second silicided region 420 extends laterally to the cavity 32 (FIG. 8 and FIG. 9) so as to come into contact with a part of the lateral internal wall of this cavity 32.

Figure 9:
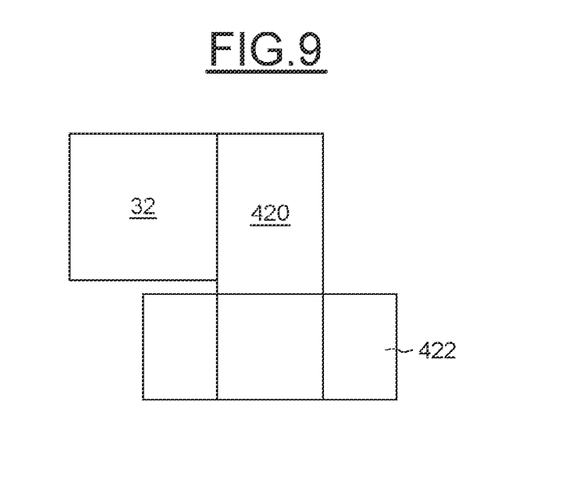
Figure 10:
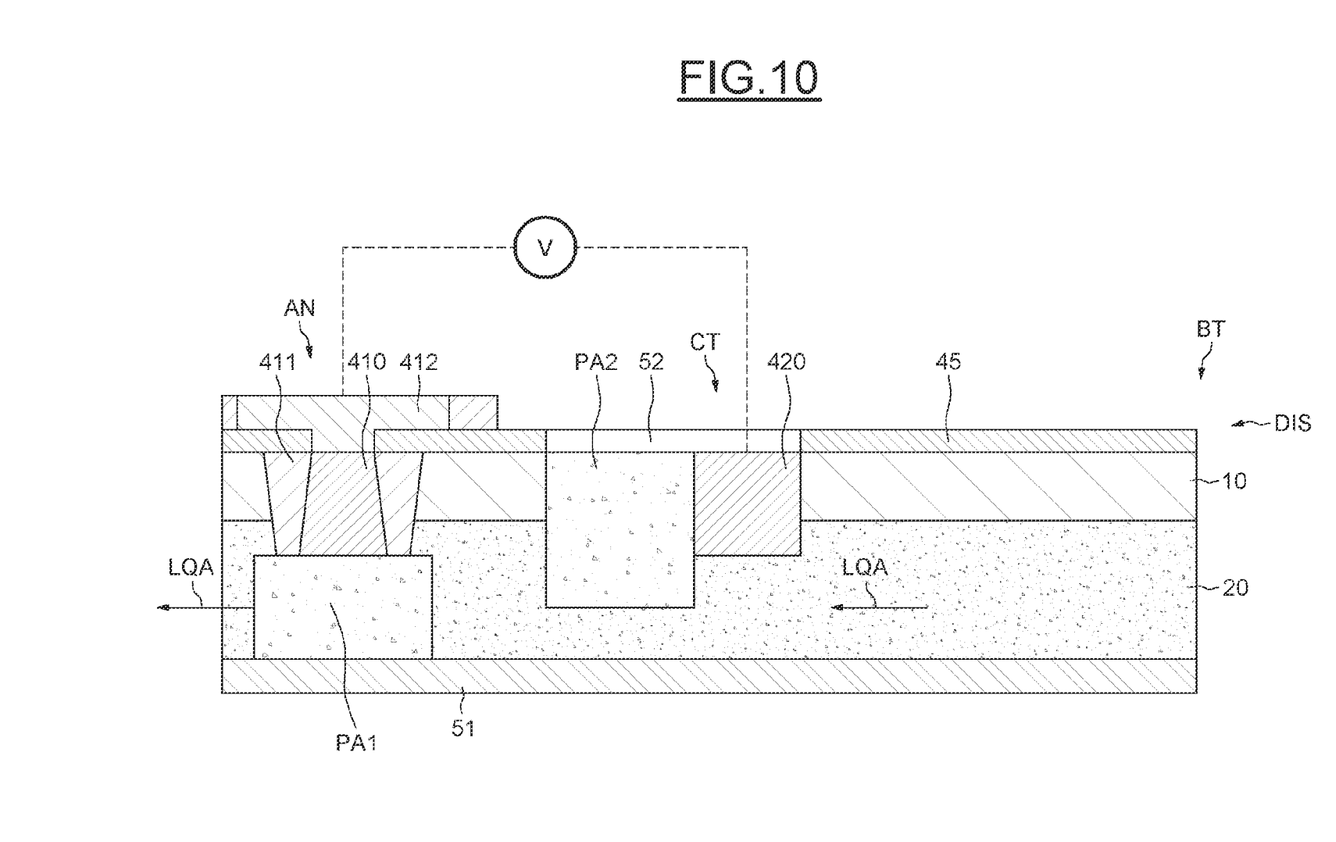
FIG. 10 illustrates schematically a second embodiment of a device.

Furthermore, as illustrated in FIG. 9, the silicided region 420 projects from the cavity 32 so that the contact pad 422 can contact this silicided region 420 while still allowing, as illustrated in FIG. 10, the application of a cover 52 so as to close off the cavity 32 after this has been filled with the second active product PA2.

The device DIS of FIG. 10 also includes, on the back face, a cover 51 for closing off the first cavity 31 after the latter has been filled with the first active product PA1.

Here again, the covers 51 and 52 may for example be silicon or glass covers.

The device DIS may also be used as a cell or even a biofuel cell, here again using the first contact 412 as anode AN and the second contact 422 as cathode CT.

Of course, whether in the embodiment of FIG. 1 or the embodiment of FIG. 9, the size of the cavities may be different. Thus, a larger cavity may be provided on the anode side than on the cathode side, or even several first cavities electrically connected together on the anode side may be provided.

Figure 11:
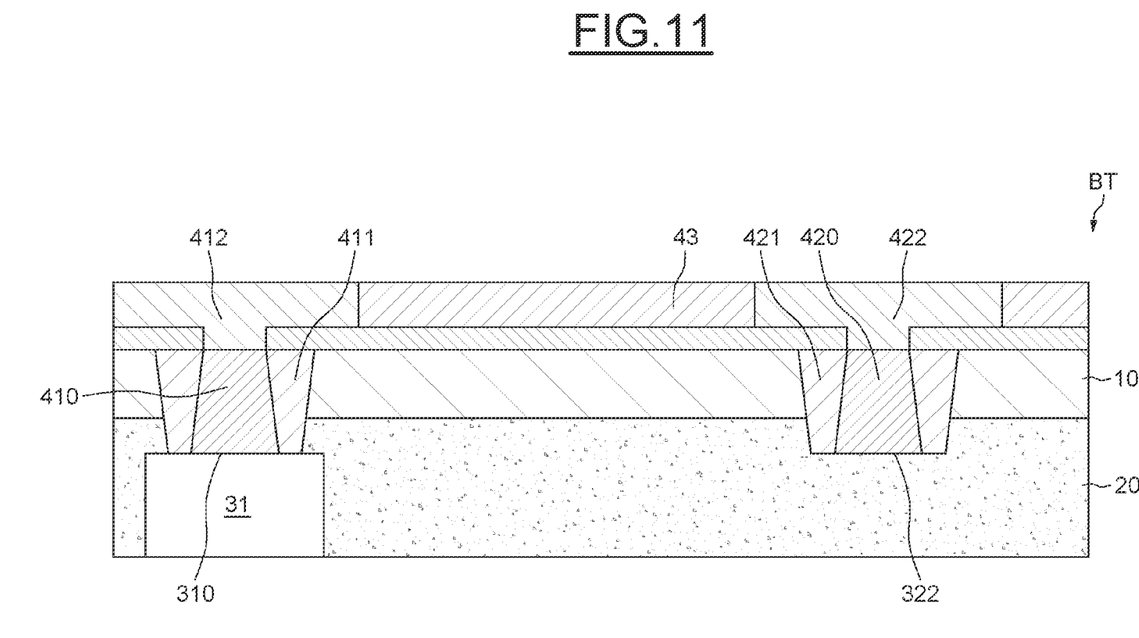
FIG. 11 illustrates schematically a third embodiment of a package.

FIG. 11 illustrates another embodiment of the package BT comprising a single cavity 31 or if need be a set of several cavities 31 joined together.

In the example illustrated in FIG. 11, a single cavity 31 is shown.

This part of the package BT again has a structure similar to that described with reference to the preceding figures.

However, no second cavity is provided in contact with the second silicided region 420. In this embodiment, the second silicided region 420 opens directly into the pores 322 of the porous silicon.

The package BT of FIG. 11 may also be used as constituent of a device BIS capable of forming a cell or even a biofuel cell.

Figure 12:
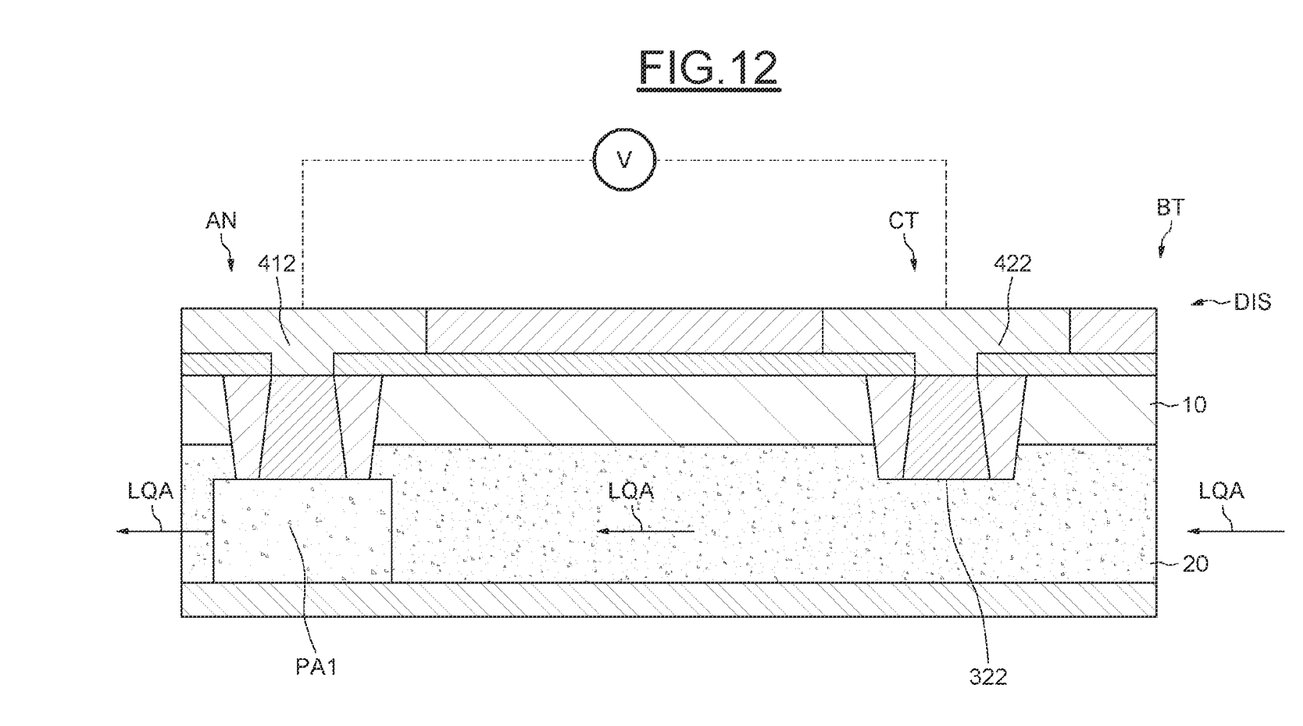
FIG. 12 illustrates schematically a third embodiment of a device.

More precisely, as illustrated in FIG. 12, this time only an active product PA1, for example in powder form, is housed in the cavity 31. A cover 5 is then bonded, in a manner similar to that described above, to the back face so as to close off the cavity.

The active fluid LQA interacts, on the one hand, with the silicided region 420 and, on the other hand, with the active product PA1 which is itself in contact with the silicided region 410. The first electrical contact electrically coupled to the active product PA1 forms for example the anode AN, whereas the second contact electrically coupled to the active fluid flowing through the porous silicon forms the cathode CT of the cell.

The device may also be used as a biofuel cell employing an appropriate active product PA1 and an appropriate active fluid LQA, for example those described in the aforementioned article entitled "Sparks of Life".

When the devices that have just been described are intended to be used as biofuel cells, they may for example be housed in an appropriate pouch or envelope which is itself implanted into a human, in a manner similar to that described in the aforementioned article by P. Cinquin.

The invention claimed is:

1. A package, comprising:
    a body including a first element made of silicon and a second element made of porous silicon;
    at least one first cavity provided at least in the porous silicon;
    a first electrically conducting contact zone electrically coupled to at least one part of at least one internal wall of said at least one first cavity; and
    a second electrically conducting contact zone electrically coupled to a portion of the package, said portion extending at least into said second element and being different from the internal walls of said at least one first cavity;
    wherein the two contact zones are electrically isolated from each other.

2. The package according to claim 1, wherein the first contact zone is located on a first face of the first element of the body, and the body comprises a first electrically conducting connection extending through the first element from said first contact zone down to said at least one part of said at least one internal wall of said at least one first cavity.

3. The package according to claim 2, wherein the first electrically conducting connection comprises a first region formed from a metal silicide surrounded by an insulating region.

4. The package according to claim 2, wherein said at least one first cavity opens onto the free face of the second element, on the opposite side from said first face of the first element.

5. The package according to claim 2, wherein the second contact zone is located on said first face of the first element of the body, and the body comprises a second electrically conducting connection extending through said first element from said second contact zone down to said portion of the package.

6. The package according to claim 5, wherein the second electrically conducting connection comprises a second region formed from a metal silicide.

7. The package according to claim 6, wherein said second region is surrounded by an insulating region.

8. The package according to claim 1, wherein a pore size of the porous silicon is of the order of a few nanometers.

9. The package according to claim 1, wherein the package has a size compatible with implantation of the package into a human.

10. The package according to claim 2, wherein the body further includes at least one second cavity provided at least in the porous silicon and said portion of the package comprises at least one part of at least one internal wall of said at least one second cavity.

11. The package according to claim 10, wherein said at least one second cavity opens onto the free face of the second element, on the opposite side from said first face of said first element.

12. The package according to claim 10, wherein said at least one second cavity opens onto said first face of said first element.

13. The package according to claim 1, wherein said portion of the package comprises pores of the porous silicon.

14. The package according to claim 10, further comprising:
    a first active product contained in said at least one first cavity;
    a second active product contained in said at least one second cavity; and
    a closure configured to close the at least one first cavity and at least one second cavity.

15. The package according to claim 14, wherein at least one of the first and second active products comprises a powder having a particle size which is greater than a pore size of the porous silicon.

16. A package, comprising:
    a silicon layer;
    a porous silicon layer adjacent the silicon layer;
    a first cavity provided in a free side of the porous silicon layer;
    a first electrical contact extending through and isolated from the silicon layer to reach the first cavity;
    a first active product contained within the first cavity; and
    a first closure attached to the free side of the porous silicon layer and adapted to close the first cavity.

17. The package of claim 16, wherein the first active product comprises a powder configured to have an electrochemical reaction in response to flow of a fluid through the porous silicon layer.

18. The package of claim 16, where the first electrical contact is a silicide formed from at least a portion of the silicon layer.

19. The package of claim 16, further comprising:
    a second electrical contact provided in a front side of the silicon layer and extending into the porous silicon layer at a distance separated from the first electrical contact.

20. The package of claim 19, wherein the first active product comprises a powder configured to have an electrochemical reaction so as to produce a voltage potential between the first and second electrical contacts in response to flow of a fluid through the porous silicon layer.

21. The package of claim 19, where the first and second electrical contacts are each a silicide formed from at least a portion of the silicon layer.

22. The package of claim 16, further comprising:
    a second cavity provided in a front side of the silicon layer and extending into the porous silicon layer at a distance separated from the first cavity;
    a second electrical contact provided in the front side of the silicon layer adjacent the second cavity at a distance separated from the first electrical contact;
    a second active product contained within the second cavity; and
    a second closure attached to the front side of the silicon layer and adapted to close the second cavity.

23. The package of claim 22, wherein the first and second active products each comprise a powder configured to have an electrochemical reaction so as to produce a voltage potential between the first and second electrical contacts in response to flow of a fluid through the porous silicon layer.

24. The package of claim 22, where the first and second electrical contacts are each a silicide formed from at least a portion of the silicon layer.

25. The package of claim 16, further comprising:
    a second cavity provided in the free side of the porous silicon layer;
    a second electrical contact extending through and isolated from the silicon layer to reach the second cavity;
    a second active product contained within the second cavity; and
    wherein the first closure attached to the free side of the porous silicon layer is further adapted to close the second cavity.

26. The package of claim 25, wherein the first and second active products each comprise a powder configured to have an electrochemical reaction so as to produce a voltage potential between the first and second electrical contacts in response to flow of a fluid through the porous silicon layer.

27. The package of claim 25, where the first and second electrical contacts are each a silicide formed from at least a portion of the silicon layer.

\* \* \* \* \*

UNITED STATES PATENT AND TRADEMARK OFFICE
CERTIFICATE OF CORRECTION

Page 1 of 1

PATENT NO. : 9,219,286 B2
APPLICATION NO. : 13/993634
DATED : December 22, 2015
INVENTOR(S) : Pascale Mazoyer et al.

It is certified that error appears in the above-identified patent and that said Letters Patent is hereby corrected as shown below:

In the Specification:

At column 2, line number 1, replace [wails] with -- walls --.

At column 2, line number 24, replace [suicide] with -- silicide --.

At column 2, line number 45, replace [clement] with -- element --.

At column 2, line number 8, replace [suicide] with -- silicide --.

At column 2, line number 66, replace [shielded] with -- silicided --.

Signed and Sealed this
Twenty-third Day of August, 2016

Michelle K. Lee
*Director of the United States Patent and Trademark Office*